: US008615215B2

United States Patent
Speicher

(10) Patent No.: US 8,615,215 B2
(45) Date of Patent: Dec. 24, 2013

(54) MOBILE RADIO ACCESS NETWORK, MOBILITY CONTROL UNIT, METHOD FOR CHARGING IN A MOBILE RADIO ACCESS NETWORK, AND PROGRAM

(75) Inventor: Sebastian Speicher, Bonn (DE)

(73) Assignee: Deutsche Telekom AG, Bonn (DE)

( * ) Notice: Subject to any disclaimer, the term of this patent is extended or adjusted under 35 U.S.C. 154(b) by 83 days.

(21) Appl. No.: 13/391,301

(22) PCT Filed: Aug. 19, 2010

(86) PCT No.: PCT/EP2010/005089
§ 371 (c)(1),
(2), (4) Date: Apr. 26, 2012

(87) PCT Pub. No.: WO2011/020614
PCT Pub. Date: Feb. 24, 2011

(65) Prior Publication Data
US 2012/0202458 A1    Aug. 9, 2012

Related U.S. Application Data

(60) Provisional application No. 61/235,178, filed on Aug. 19, 2009.

(30) Foreign Application Priority Data

Aug. 19, 2009    (EP) .................................... 09010664

(51) Int. Cl.
*H04M 11/00*    (2006.01)
(52) U.S. Cl.
USPC ............................ 455/408; 455/405; 455/406
(58) Field of Classification Search
USPC .......................................... 455/408, 405, 406
See application file for complete search history.

(56) References Cited

U.S. PATENT DOCUMENTS

2005/0089020 A1    4/2005    Ahlback et al.
2008/0293419 A1    11/2008    Somasundaram et al.
(Continued)

FOREIGN PATENT DOCUMENTS

CN    101287294 A    10/2008
CN    201230374 Y    4/2009
(Continued)

OTHER PUBLICATIONS

3GPP TS 23.002, "3$^{rd}$ Generation Partnership Project; Technical Specification Group Services and Systems Aspects; Network architecture (Release 9)", Jun. 2009, p. 1-92.
3GPP TS 23.401, "3$^{rd}$ Generation Partnership Project; Technical Specification Group Services and Systems Aspects; Evolved Universal Terrestrial Radio Access Network (E-UTRAN) access (Release 9)", Mar. 2010, p. 1-258.
(Continued)

*Primary Examiner* — Barry Taylor
(74) *Attorney, Agent, or Firm* — Leydig, Voit & Mayer, Ltd.

(57) ABSTRACT

A mobile radio access network includes a plurality of radio cells, the plurality of radio cells comprising at least a first cell type of radio cells and a second cell type of radio cells, the first cell type of radio cells including at least one of a Closed Subscriber Group (CSG) cell and a hybrid cell, and the second cell type of radio cells including open cells; and a charging unit, configured to receive cell information corresponding to at least one subscriber out of a plurality of subscribers, wherein the cell information is dependent on whether the subscriber has entered, left, or accessed a radio cell of the first tell type.

12 Claims, 1 Drawing Sheet

(56) References Cited

U.S. PATENT DOCUMENTS

| | | | |
|---|---|---|---|
| 2010/0216439 A1 | 8/2010 | Marcelli et al. | |
| 2010/0291927 A1* | 11/2010 | Wu et al. | 455/435.3 |
| 2011/0269465 A1* | 11/2011 | Xu et al. | 455/436 |
| 2012/0106349 A1* | 5/2012 | Adjakple et al. | 370/241 |
| 2013/0058292 A1* | 3/2013 | Wang et al. | 370/329 |
| 2013/0079021 A1* | 3/2013 | Centonza | 455/444 |
| 2013/0089076 A1* | 4/2013 | Olvera-Hernandez et al. | 370/332 |

FOREIGN PATENT DOCUMENTS

| | | |
|---|---|---|
| WO | WO 03081843 A1 | 10/2003 |
| WO | WO 2008137376 A2 | 11/2008 |
| WO | WO 2009049679 A1 | 4/2009 |

OTHER PUBLICATIONS

3GPP TS 23.060, "$3^{rd}$ Generation Partnership Project; Techinical Specification Group Services and Systems Aspects; General Packet Radio Service (GPRS); Service description: Stage 2 (Release 9)", Sep. 2010, p. 1-297.

Huawei: "CSG based Charging 23.203" 3GPP Draft; S2-094415 CSG Based Charging 23203, $3^{rd}$ Generation Partnership Project (3GPP), Mobile Competence Centre: 650, Route Des Lucioles; F-06921 Sophia-Antipolis Cedex; France; Jun. 29, 2009, p. 1-8.

European Patent Office, International Search Report in International Patent Application No. PCT/EP2010/005089 (Oct. 10, 2010).

Huawei, CSG based Charging 23.203, 3GPP TSG-SA2 Meeting #74, S2-094415, pp. 1-8, release 9, Jun. 29, 2009, Sophia Antipolis, France.

\* cited by examiner

MOBILE RADIO ACCESS NETWORK, MOBILITY CONTROL UNIT, METHOD FOR CHARGING IN A MOBILE RADIO ACCESS NETWORK, AND PROGRAM

CROSS-REFERENCE TO RELATED APPLICATIONS

This patent application is a national stage entry under 35 U.S.C. §371 of International Application No. PCT/EP2010/005089, filed Aug. 19, 2010, and claims priority to European Patent Application No. EP09010664.2, filed Aug. 19, 2009, and to U.S. Provisional Application No. 61/235,178, filed Aug. 19, 2009. The International Application was published in English on Feb. 24, 2011, as WO 2011/020614 A1.

FIELD

The present invention relates to a mobile radio access network, a mobility control unit, a method for charging in a mobile radio access network, and a program including a computer readable program code, wherein the mobile radio access network includes a plurality of radio cells, the radio cells include at least a first cell type of radio cells and a second cell type of radio cells, the first cell type of radio cells being at least one CSG-cell or at least one hybrid cell and the second cell type radio cells being at least one open cell (non-CSG-cell), wherein the mobile radio access network comprises a charging unit.

BACKGROUND

The third generation partnership project (3GPP) has defined a concept to enable mobile operators to restrict access to a cellular base station (or a group of cellular base stations) to a limited group of subscribers. This group of subscribers is called a Closed Subscriber Group (CSG). The notion of CSGs is realized by assigning a unique Closed Subscriber Group ID (CSG ID) to the cell or the group of cells that access shall be limited for and by broadcasting the CSG ID as well as a CSG indicator, which declares the cell to be a closed cell, on the cell's broadcast channel. Furthermore, each subscriber's subscription contains a list of CSG IDs, which denote the CSG cells that this subscriber is allowed to access (the so-called Allowed CSG list).

Based on this information, the mobile radio access network (hereinafter also called system) performs access control: when a subscriber (or a subscriber's terminal) attempts to access the network via a CSG cell, the system checks whether the cell's CSG ID is contained in the subscriber's Allowed CSG list. If so, the access is allowed, otherwise the access is denied.

In addition to such radio cells having restricted access (i.e., which are closed), hereinafter also called CSG cells, 3GPP has defined the notion of hybrid cells. Hybrid cells are defined as a combination of CSG cells and open cells (i.e., non-CSG cells). In other words, hybrid radio cells comprise a CSG part and an open part. The key idea is that any subscriber of the mobile radio access network is allowed to access the open part of a hybrid cell but that only members of the CSG part of the hybrid cell have access to the CSG part of the hybrid cell, thus, for example, receiving a better service in terms of quality of service, bandwidth or the like.

The CSG concept and the concept of hybrid cells is explained in the following technical specifications: 3GPP TS 23.002, "$3^{rd}$ Generation Partnership Project; Technical Specification Group Services and Systems Aspects; Network architecture (Release 9)", 3GPP TS 23.401, "$3^{rd}$ Generation Partnership Project; Technical Specification Group Services and Systems Aspects; Evolved Universal Terrestrial Radio Access Network (E-UTRAN) access (Release 9)", 3GPP TS 23.060, "$3^{rd}$ Generation Partnership Project; Technical Specification Group Services and Systems Aspects; General Packet Radio Service (GPRS); Service description; Stage 2 (Release 9)". With regard to details of the CSG concept and the concept of hybrid cells, these three documents are incorporated by reference herein.

It is desirable to perform differentiated charging for CSG cells, hybrid cells and non-CSG cells (e.g. non-CSG macro network cells). An example for differentiated charging is to charge lower rates when a subscriber is accessing the network via a CSG cell (which might for example be a CSG-concept based femto cell or home base station that is installed in the subscriber's home) in comparison to the rates when the subscriber accesses the network via a non-CSG cell (e.g., a non-CSG macro cell).

However, there have not been any efficient solutions to enable this type of differentiated charging for CSG cells. One possible solution would be to report any change of cells for each subscriber to the network element which performs charging, hereinafter also called the charging unit (e.g., the GPRS Gateway Support Node, GGSN, or the Packet Data Network Gateway, PDN-GW in 3GPP systems). This would mean that each time a subscriber performs a handover to another cell or performs a signalling interaction in another cell, the ID of this cell is reported to the network element responsible for charging (the charging unit). Based on this cell ID, the charging network element can derive (using an additional database) whether the reported cell ID belongs to a CSG cell or hybrid cell and whether the subscriber is a member in this CSG—and can leverage this information for differentiated charging. However, the disadvantage of such an approach would be massive signalling overhead because (a) the change of cells needs to be reported for all cells in a network irrespective of whether the cell a subscriber is currently accessing is a CSG cell, a hybrid cell or a non-CSG cell, and (b) especially for highly mobile transceivers, cell changes happen very frequently.

SUMMARY

In an embodiment, the present invention provides a mobile radio access network. The mobile radio access network includes: a plurality of radio cells, the plurality of radio cells comprising at least a first cell type of radio cells and a second cell type of radio cells, the first cell type of radio cells being at least one of a Closed Subscriber Group (CSG) cell and a hybrid cell, and the second cell type of radio cells being open cells; and a charging unit, configured to receive cell information corresponding to at least one subscriber out of a plurality of subscribers, wherein the cell information is dependent on whether the subscriber has entered, left, or accessed a radio cell of the first cell type. A transmission of the cell information to the charging unit occurs or not at the at least one subscriber entering, leaving, or accessing the radio cell of the first type. The transmission of the cell information depends on the at least one subscriber entering, leaving, or accessing the CSG cell, a CSG part of the hybrid cell, or an open part of the hybrid cell. A first information indicates whether the cell information is to be transmitted or not to the charging unit in the case that the at least one subscriber enters, leaves, or accesses the CSG cell. A second information indicates whether the cell information is to be transmitted or not to the charging unit in the case that the at least one subscriber enters, leaves, or accesses the CSG part of the hybrid cell. A third information indicates whether the cell information is to be transmitted or not to the charging unit in the case that the at least one subscriber enters, leaves, or accesses the open part of the hybrid cell.

DETAILED DESCRIPTION

Figure 1:
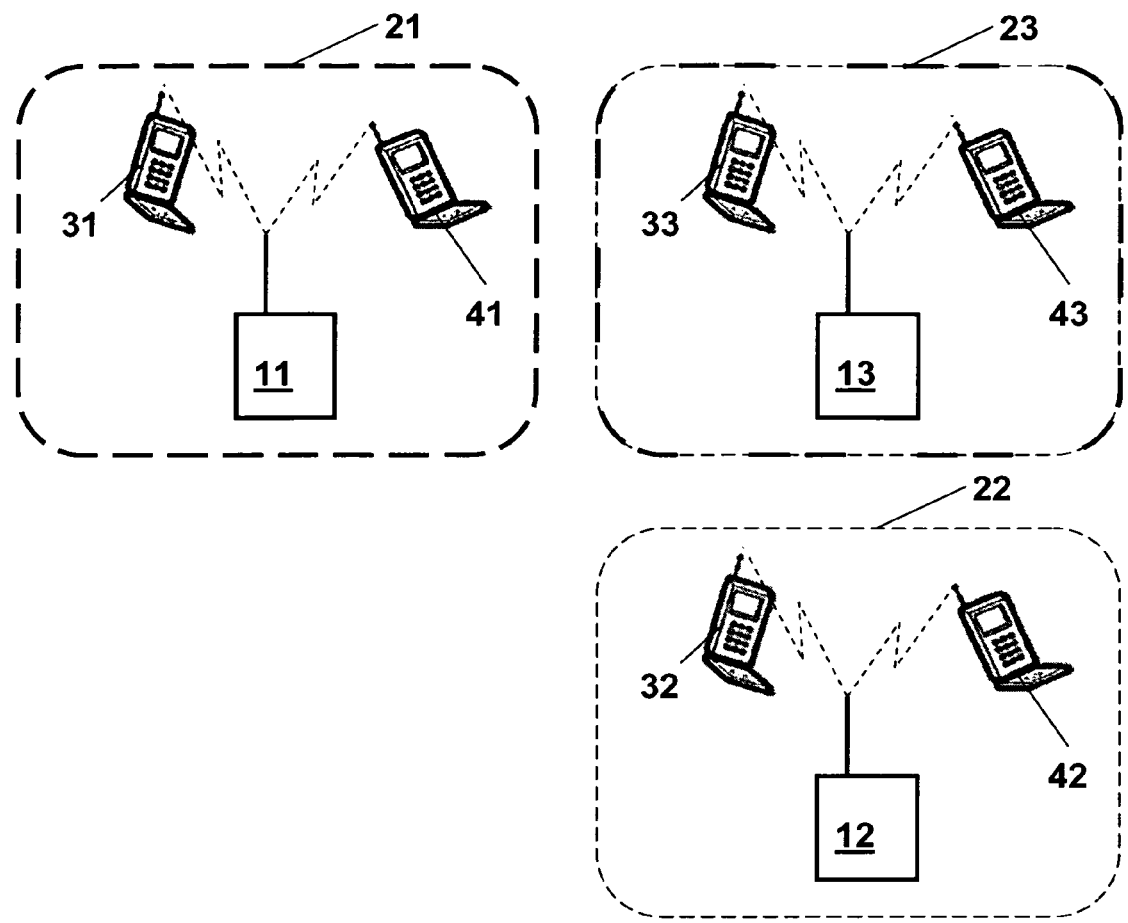
FIG. 1 schematically illustrates three different cells of a mobile radio access network.

In various embodiments, the present invention provides a mobile radio access network, a mobility control unit for differentiated charging in a mobile radio access network, a method for differentiated charging for CSG cells and/or hybrid cells and/or non-CSG cells in a mobile radio access network and a program including a computer readable program code for controlling a mobility control unit.

In an embodiment, a mobile radio access network includes a plurality of radio cells, the radio cells including at least a first cell type of radio cells and a second cell type of radio cells, the first cell type of radio cells being at least one CSG-cell or at least one hybrid cell and the second cell type radio cells being at least one open cell (non-CSG-cell), wherein the mobile radio access network includes a charging unit, wherein the mobile radio access network is provided such that at least for one subscriber out of a plurality of subscribers of the mobile radio access network, the charging unit receives a cell information dependent on whether the at least one subscriber has entered and/or left and/or accessed a radio cell of the first cell type.

It is thereby advantageously possible to provide the possibility of differentiated charging in the mobile radio access network without the drawback of too much increased overhead. In particular, it is not necessary to report (to the charging unit) of any cell change within radio cells of the second cell type, (i.e., open cells or non-CSG cells).

In an embodiment, the charging unit receives cell information dependent on whether the at least one subscriber has entered and/or left and/or accessed a radio cell of the first cell type according to at least one situation out of:

the plurality of radio cells of the mobile radio access network including at least one CSG-cell and at least one hybrid cell, wherein the transmission of the cell information to the charging unit occurs or not at the at least one subscriber entering and/or leaving and/or accessing the CSG-cell or the hybrid cell, wherein the transmission of the cell information depends on the at least one subscriber entering and/or leaving and/or accessing either the CSG-cell or the hybrid cell, the plurality of radio cells of the mobile radio access network including at least one hybrid cell, wherein the transmission of the cell information to the charging unit occurs or not at the at least one subscriber entering and/or leaving and/or accessing the hybrid cell, wherein the transmission of the cell information depends on the at least one subscriber entering and/or leaving and/or accessing either the CSG part of the hybrid cell or the open part of the hybrid cell, the plurality of radio cells of the mobile radio access network including at least one CSG-cell and at least one hybrid cell, wherein the transmission of the cell information to the charging unit occurs or not at the at least one subscriber entering and/or leaving and/or accessing the CSG cell or the hybrid cell, wherein the transmission of the cell information depends on the at least one subscriber entering and/or leaving and/or accessing either the CSG-cell or the CSG part of the hybrid cell or the open part of the hybrid cell.

This means that in the case of the first mentioned situation, the transmission of the cell information to the charging unit depends on the at least one subscriber entering and/or leaving and/or accessing either the CSG-cell or the hybrid cell. Not all contacts of the at least one subscriber with a CSG-cell or with a hybrid cell lead to the transmission of the cell information to the charging unit but, for example, only the contacts to the CSG-cell (and not the contacts to the hybrid cell) or vice versa.

In the case of the second mentioned situation, the transmission of the cell information to the charging unit depends on the at least one subscriber entering and/or leaving and/or accessing either the CSG part of the hybrid cell or the open part of the hybrid cell. Not all contacts of the at least one subscriber with the CSG part of the hybrid cell or with the open part of the hybrid cell lead to the transmission of the cell information to the charging unit but, for example, only the contacts to the CSG part of the hybrid cell (and not the contacts to the open part of the hybrid cell) or vice versa.

In the case of the third mentioned situation, the transmission of the cell information to the charging unit depends on the at least one subscriber entering and/or leaving and/or accessing either the CSG-cell or the CSG part of the hybrid cell or the open part of the hybrid cell. Not all contacts of the at least one subscriber with the CSG-cell or with the CSG part of the hybrid cell or with the open part of the hybrid cell lead to the transmission of the cell information to the charging unit but, for example, only the contacts to the CSG-cell and to the CSG part of the hybrid cell (and not the contacts to the open part of the hybrid cell) or vice versa. In another example, only the contacts to the CSG-cell and to the open part of the hybrid cell (and not the contacts to the CSG part of the hybrid cell) lead to the transmission of the cell information to the charging unit.

In an embodiment, a plurality of different pieces of information are used to perform control of whether the cell information in a given situation is to be transmitted or not. In a further embodiment, the mobile radio access network includes a database, wherein the database (55) includes the pieces of information defining whether the cell information is to be transmitted to the charging unit or not in specific situations. According to different embodiments or modes of operation of the mobile radio access network:

a first information indicates whether the cell information (63) is to be transmitted or not to the charging unit (53) in the case that the at least one subscriber enters and/or leaves and/or accesses the CSG-cell (21), and a second information indicates whether the cell information (63) is to be transmitted or not to the charging unit (53) in the case that the at least one subscriber enters and/or leaves and/or accesses the hybrid cell (21). In this embodiment or mode of operation of the mobile radio access network, the database includes the first information and the second information;

a third information indicates whether the cell information (63) is to be transmitted or not to the charging unit (53) in the case that the at least one subscriber enters and/or leaves and/or accesses the CSG part of the hybrid cell (23), and a fourth information indicates whether the cell information (63) is to be transmitted or not to the charging unit (53) in the case that the at least one subscriber enters and/or leaves and/or accesses the open part of the hybrid cell (23). In this embodiment or mode of operation of the mobile radio access network, the database (55) includes the third information and the fourth information;

a first information indicates whether the cell information (63) is to be transmitted or not to the charging unit (53) in the case that the at least one subscriber enters and/or leaves and/or accesses the CSG-cell (21), a third information indicates whether the cell information (63) is to be transmitted or not to the charging unit (53) in the case that the at least one subscriber enters and/or leaves and/or accesses the CSG part of the hybrid cell (23), and a fourth information indicates whether the cell information (63) is to be transmitted or not to the charging unit (53) in the case that the at least one subscriber enters and/or leaves and/or accesses the open part of the hybrid cell (23). In this embodiment or mode of operation of the mobile radio access network, the database (55) includes the first information, the third information, and the fourth information.

In the context of the present invention the term "entering a radio cell by a subscriber" means the following:

In the case that the subscriber is not yet registered with the network, entering a radio cell also includes the registration with the network through that radio cell (e.g., the Attach procedure for a UTRAN/E-UTRAN network). In the case that the subscriber is registered with the network, entering a radio cell includes the contact of the subscriber/the subscriber's mobile terminal with that radio cell for mobility management purposes (e.g., handover in case of active communication, location area update or routing area update or tracking area update in case of an idle mobile terminal).

In the context of the present invention the term "leaving a radio cell by a subscriber" means the following:

In the case that the subscriber stays registered with the network, leaving a first radio cell includes the contact of the subscriber/the subscriber's mobile terminal with a different second radio cell for mobility management purposes (e.g., handover to the second radio cell in case of active communication; location area update, routing area update, or tracking area update in the second radio cell in case of an idle mobile terminal). In the case that the subscriber leaves the network completely, leaving a radio cell also includes the deregistration from the network through that radio cell (e.g., the Detach procedure for a UTRAN/E-UTRAN network).

In the context of the present invention the term "accessing a radio cell by a subscriber" means the following:

In the case that the subscriber is registered with the network, accessing a radio cell includes the contact of the subscriber/the subscriber's mobile terminal with that radio cell for performing data, voice and/or signalling transmission.

In the context of the present invention, it is to be understood that the expression "the subscriber is (or is not) registered with the network" means that a mobile terminal of the subscriber is (or is not) registered with the network. The same applies to the expressions "the subscribers accesses/is connected to/performs a handover/performs a signalling indication/enters a cell/leaves a cell", which refer to a mobile terminal of the subscriber, which "accesses/is connected to/performs a handover/performs a signalling indication/enters a cell/leaves a cell". To this extent, the terms "subscriber" and "mobile terminal" are used synonymously within the context of the present invention.

In the context of the present invention the term "cell information transmitted/to be transmitted to the charging unit" includes information relevant for the CSG cell/hybrid cell dependent charging of a subscriber, for example, the CSG ID, the access mode, and for hybrid cells additionally the CSG membership status.

In the context of the present invention the term "mobile radio access network" can include a public land mobile network or an access network together with a core network.

In an embodiment:
a CSG-cell is a radio cell being accessible by a predetermined closed group of subscribers (CSG, Closed Subscriber Group) only,
an open cell (non-CSG-cell) is a radio cell being accessible, in principle, by any subscriber of the mobile radio access network, and
a hybrid cell is a combination of a CSG part and an open part such that the open part of the hybrid cell is accessible, in principle, by any subscriber of the mobile radio access network, and that the CSG part of the hybrid cell provides privileged access to a predetermined closed group of subscribers.

Thus, the CSG-cell is a radio network cell where only a predetermined closed subscriber group (or closed group of subscribers) can have access to such a CSG-cell.

In an embodiment, the plurality of radio cells of the mobile radio access network include at least one CSG-cell and at least one hybrid cell, and the transmission of the cell information to the charging unit occurs or not at the at least one subscriber entering and/or leaving and/or accessing the CSG-cell or the hybrid cell, wherein the transmission of the cell information depends on the at least one subscriber entering and/or leaving and/or accessing either the CSG-cell or the hybrid cell.

Thereby, it is advantageously possible to provide very fine-grained reporting for charging purposes, thus limiting the signalling overhead to the minimum required for realizing the (charging) functionality for CSG cells and/or hybrid cells and/or non-CSG cells within the mobile radio access network.

In a further embodiment, the mobile radio access network includes a database, wherein the database includes a first information and a second information, wherein the first information indicates whether the cell information is to be transmitted or not to the charging unit in the case that the at least one subscriber enters and/or leaves and/or accesses the CSG-cell, and wherein the second information indicates whether the cell information is to be transmitted or not to the charging unit in the case that the at least one subscriber enters and/or leaves and/or accesses the hybrid cell.

Thereby, it is advantageously possible to further reduce the signalling overhead for charging purposes by providing (inside the database and from the database to the mobility control unit) flag-like information associated to a specific subscriber and to transmit the cell information to the charging unit only for those cases where this cell information is required. In an embodiment, the database is a unit or an entity comprising or hosting the Subscription Profile Repository (SPR) or, according to an alternative embodiment, a database for an online charging system. The Subscription Profile Repository (SPR) logical entity contains all subscriber/subscription related information needed for subscription-based policies.

According to a further embodiments of the present invention:
the plurality of radio cells of the mobile radio access network include at least one hybrid cell, and the transmission of the cell information to the charging unit occurs or not at the at least one subscriber entering and/or leaving and/or accessing the hybrid cell, wherein the transmission of the cell information depends on the at least one subscriber entering and/or leaving and/or accessing either the CSG part of the hybrid cell or the open part of the hybrid cell, the mobile radio access network includes a database, wherein the database includes a third information and a fourth information, wherein the third information indicates whether the cell information is to be transmitted or not to the charging unit in the case that the at least one subscriber enters and/or leaves and/or accesses the CSG part of the hybrid cell, and wherein the fourth information indicates whether the cell information is to be transmitted or not to the charging unit in the case that the at least one subscriber enters and/or leaves and/or accesses the open part of the hybrid cell, the plurality of radio cells of the mobile radio access network include at least one CSG-cell and at least one hybrid cell, and wherein the transmission of the cell information to the charging unit occurs or not at the at least one subscriber entering and/or leaving and/or accessing the CSG cell or the hybrid cell, wherein the transmission of the cell information depends on the at least one subscriber entering and/or leaving and/or accessing either the CSG-cell or the CSG part of the hybrid cell or the open part of the hybrid cell, and the mobile radio access network includes a database, wherein the database includes a first information, a third information and a fourth information, wherein the first information indicates whether the cell information is to be transmitted or not to the charging unit in the case that the at least one subscriber enters and/or leaves and/or accesses the CSG-cell, wherein the third information indicates whether the cell information is to be transmitted or not to the charging unit in the case that the at least one subscriber enters and/or leaves and/or accesses the CSG part of the hybrid cell, and wherein the fourth information indicates whether the cell information is to be transmitted or not to the charging unit in the case that the at least one subscriber enters and/or leaves and/or accesses the open part of the hybrid cell.

All these embodiments of the present invention also provide for the possibility of very fine-grained reporting for charging purposes, thus limiting the signalling overhead to the minimum required for realizing the (charging) functionality for CSG cells and/or hybrid cells and/or non-CSG cells within the mobile radio access network. In particular, the present invention provides for the possibility to differentiate—especially with respect to charging purposes—between the cases where a mobile terminal of a subscriber enters or leaves or accesses a CSG cell (CSG radio cell) as opposed to the mobile terminal of a subscriber entering or leaving or accessing a hybrid cell. It is even possible to easily (and on a subscriber-based decision level) differentiate between the cases that a subscriber enters or leaves or accesses the CSG part of a hybrid cell versus the subscriber entering or leaving or accessing the non-CSG part (or open part) of a hybrid cell. Such a differentiation between these different cases of a mobile terminal (or a subscriber) having contact to different kinds of radio cells can be very important from an operator's point of view as certain of these different cases are very likely to occur very frequently in practice.

In an example, a mobile operator only wants to perform differentiated charging for CSG cells versus non-CSG cells (open cells), but does not want to perform differentiated charging for non-CSG members of a hybrid cell versus subscribers using a normal non-CSG cell (open cell). Reporting of the CSG ID, the Access mode (indicating whether the cell is a CSG cell or a hybrid cell), as well as the CSG membership (indicating—in case of a hybrid cell—whether the subscriber is a member of the (CSG part of the) hybrid cell), would lead to a reporting in every case a subscriber enters or leaves or accesses a hybrid cell and therefore would mean a massive unneeded signalling overhead. An increase in the number of deployed hybrid cells (which is likely to occur), makes this described situation of a non-adapted reporting for charging purposes even worse. Thus, the present invention provides an optimized differentiated CSG charging solution that is based on the idea of reporting CSG-related information (like a CSG ID information and/or an Access mode information and/or a CSG membership information) to the charging network element (or charging unit) and allows for flexible, fine-grained control of the reporting. The main benefit is significantly less signalling overhead. One aspect of the present invention resides in the definition of a mechanism which allows for a configuration of the CSG reporting (especially for charging purposes) per subscriber, per type of cell (CSG cell, hybrid cell) and, in addition for hybrid cells, per membership status (member/non-member of the CSG part of the hybrid cell).

In a further embodiment, the charging unit receives the cell information dependent on: a cell identification information of the radio cells of the first cell type being at least one CSG-cell or at least one hybrid cell, and/or the at least one subscriber, and/or an Access Point Name (APN) used by the at least one subscriber.

Thereby, it is advantageously possible to provide a still finer granularity in reporting charging information with regard to the access of CSG cells or hybrid cells (than by using only the different pieces of information as described above with respect to the first and second information, the third and fourth information, or the first, third and fourth information), and hence it is possible to still further reduce the network load or adapt the reporting of the cell information to the charging unit to the needs. For example, it is advantageously possible that only for a part of the CSG-cells or for only a part of the hybrid cells (of the public land mobile network or the access network) the cell information is transmitted to the charging unit; i.e., it is possible that for other CSG cells or other hybrid cells, no cell information at all is transmitted to the charging unit.

In order to realize such a mode of operation of the mobile radio access network, it is, for example, possible to store at least two out of the first, second, third and fourth information related to a group of cell identification information (and a different set of at least two out of the first, second, third and fourth information related to another group of cell identification information). In the case that the reporting (or the transmission) of the cell information to the charging unit occurs dependent on the cell identification information, then the cell identification information is used to determine to which group of cells (i.e., of which group of cell identification information) the contacted cell belongs and the appropriate control information for the reporting (i.e., the appropriate at least two out of the first, second, third and fourth information related to the concerned group of cell information) is used. In one exemplary embodiment, it is possible to store the first, third and fourth information for each cell identification information (for every cell of the network) or for such above mentioned groups of cells (i.e., groups of cell identification information) such that the appropriate reporting behavior is achieved.

The present invention also relates to a mobility control unit for differentiated charging in an inventive mobile radio access network, wherein the mobility control unit generates and transmits the cell information to the charging unit, wherein the mobility control unit is one out of a MSC unit (Mobile Switching Center unit) or a SGSN unit (Serving GPRS Support Node) or a MME unit (Mobility Management Entity unit). In the context of the present invention, the term "mobility control unit" and "traffic control unit" are used synonymously.

Furthermore, the present invention relates to a method for differentiated charging in a mobile radio access network, the mobile radio access network including a plurality of radio cells, the radio cells including at least a first cell type of radio cells and a second cell type of radio cells, the first cell type of radio cells being at least one CSG-cell or at least one hybrid cell and the second cell type radio cells being at least one open cell (non-CSG-cell), wherein the mobile radio access network includes a charging unit, the method including the step of: transmitting a cell information to the charging unit, wherein the transmission of the cell information depends on at least one subscriber entering or leaving or accessing a radio cell of the first cell type.

In an embodiment, the method includes the step of transmitting the cell information to the charging unit, wherein the transmission of the cell information depends on at least one subscriber entering and/or leaving and/or accessing a radio cell of the first cell type according to at least one situation out of:

the plurality of radio cells of the mobile radio access network including at least one CSG-cell and at least one hybrid cell, wherein the transmission of the cell information to the charging unit occurs or not at the at least one subscriber entering and/or leaving and/or accessing the CSG-cell or the hybrid cell, wherein the transmission of the cell information depends on the at least one subscriber entering and/or leaving and/or accessing either the CSG-cell or the hybrid cell, the plurality of radio cells of the mobile radio access network including at least one hybrid cell, wherein the transmission of the cell information to the charging unit occurs or not at the at least one subscriber entering and/or leaving and/or accessing the hybrid cell, wherein the transmission of the cell information depends on the at least one subscriber entering and/or leaving and/or accessing either the CSG part of the hybrid cell or the open part of the hybrid cell, the plurality of radio cells of the mobile radio access network including at least one CSG-cell and at least one hybrid cell, wherein the transmission of the cell information to the charging unit occurs or not at the at least one subscriber entering and/or leaving and/or accessing the CSG cell or the hybrid cell, wherein the transmission of the cell information depends on the at least one subscriber entering and/or leaving and/or accessing either the CSG-cell or the CSG part of the hybrid cell or the open part of the hybrid cell.

According to further embodiments:
a first information indicates whether the cell information is to be transmitted or not to the charging unit in the case that the at least one subscriber enters and/or leaves and/or accesses the CSG-cell, and a second information indicates whether the cell information is to be transmitted or not to the charging unit in the case that the at least one subscriber enters and/or leaves and/or accesses the hybrid cell a third information indicates whether the cell information is to be transmitted or not to the charging unit in the case that the at least one subscriber enters and/or leaves and/or accesses the CSG part of the hybrid cell, and a fourth information indicates whether the cell information is to be transmitted or not to the charging unit in the case that the at least one subscriber enters and/or leaves and/or accesses the open part of the hybrid cell.

a first information indicates whether the cell information is to be transmitted or not to the charging unit in the case that the at least one subscriber enters and/or leaves and/or accesses the CSG-cell, a third information indicates whether the cell information is to be transmitted or not to the charging unit in the case that the at least one subscriber enters and/or leaves and/or accesses the CSG part of the hybrid cell, and a fourth information indicates whether the cell information is to be transmitted or not to the charging unit in the case that the at least one subscriber enters and/or leaves and/or accesses the open part of the hybrid cell.

The present invention also relates to a program comprising a computer readable program code for controlling an inventive mobility control unit.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, three different cells of a mobile radio access network are schematically shown. In the upper part of FIG. 1, a first cell type of a radio cell of the mobile radio access network according to the present invention is shown. The first cell type corresponds either to a CSG cell 21 (depicted on the left hand upper side of FIG. 1) or a so-called hybrid cell 23 (depicted on the right hand upper side of FIG. 1). In the lower part of FIG. 1, a second cell type of a radio cell of the mobile radio access network according to the present invention is shown. The second cell type corresponds to a non-CSG cell 22, also called an open cell. The radio cells 21, 22, 23 depicted in FIG. 1 are only meant as representatives for a plurality of radio cells 21, 22, 23 present in the mobile radio access network according to the present invention. The CSG cell 21 includes a first base station 11, the hybrid cell 23 includes a third base station 13, and the non-CSG cell 22 (or open cell 22) includes a second base station 12. Moreover, the exemplary embodiment represented in FIG. 1 shows two mobile terminals (e.g., of different subscribers) for each of the radio cells 21, 22, 23. The CSG cell 21 includes a first and second mobile terminal 31, 41. The hybrid cell 22 includes a fifth and sixth mobile terminal 33, 43. The non-CSG cell 22 includes a third and fourth mobile terminal 32, 42. The hybrid cell 23 includes a CSG part (not shown in FIG. 1) and an open part (or non-CSG part) (not shown in FIG. 1).

Figure 2:
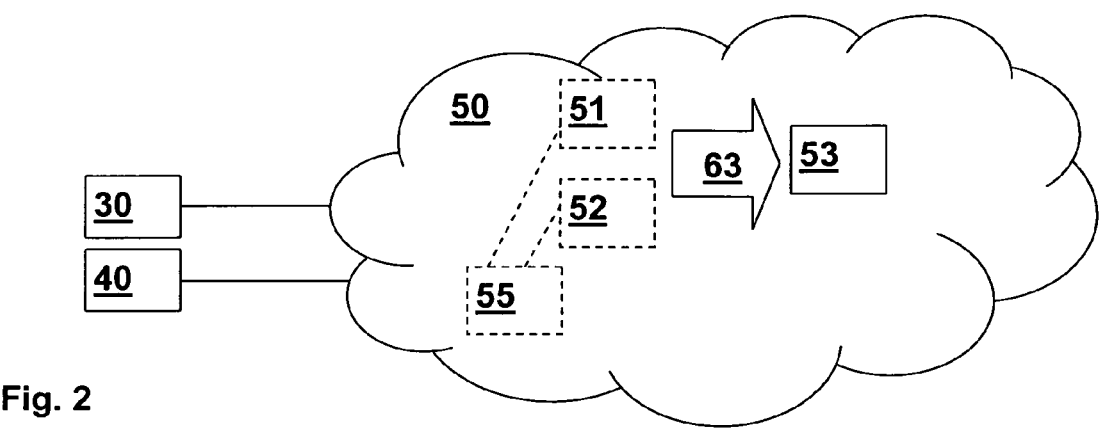
FIG. 2 schematically illustrates a mobile radio access network according to an embodiment of the present invention.

In FIG. 2, the mobile radio access network 50 according to an embodiment of the present invention is schematically shown. In the example shown, mobile terminals 30, 40 (or subscribers 30, 40) are connected to the mobile radio access network 50. The mobile radio access network 50 includes a charging unit 53. The charging unit receives cell information 63. The cell information 63 is generated by mobility control units 51, 52. The mobility control units 51, 52 are preferably a Mobile Switching Center unit (MSC) 51 or a Serving Gateway GPRS Support Node (SGSN) 51 (especially for the case of a GERAN/UTRAN network) and/or a Mobile Management Entity (MME) 52 (especially for the case of an E-UTRAN/LTE (Long Term Evolution) network). The mobility control units 51, 52 generate the cell information 63 in dependency of the subscribers 30, 40 entering or leaving or accessing certain types of radio cells 21, 22, 23. According to the present invention, the number of pieces of cell information 63 can be reduced to a minimum. Therefore, the mobility control units 51, 52 perform a check of whether the generation of charging information 63 is necessary. In an embodiment, this is done by the definition of a mechanism which allows for a configuration of the CSG reporting (especially for charging purposes), i.e., the cell information 63, per subscriber, per type of cell (CSG cell, hybrid cell) and, in addition for hybrid cells, per membership status (member/non-member of the CSG part of the hybrid cell) of the subscribers.

In detail, the mechanism works as follows:

In a mobile radio access network 50 (or wireless network), which supports the concept of CSGs (and hence CSG cells 21) and hybrid cells 23, the state information, which is held in the network about the subscriber and it's active communication sessions (e.g. PDN (Packet Data Network) connections in a 3GPP network) is extended by an information whether to report (a cell information 63) if the subscriber enters or leaves or accesses a cell of type X, where X can either be:

a CSG cell 21 or a hybrid cell 23, in which the subscriber is a CSG member of the CSG part (or the CSG cell part) of the hybrid cell 23 or a hybrid cell 23, in which the subscriber is not a CSG member of the CSG part (or the CSG cell part) of the hybrid cell 23.

Conceptually, this can be realized by way of a set of (flag) variables, which are stored per subscriber, e.g., in a database 55 of the radio access network 50, e.g., the Subscription Profile Repository (SPR), and which are signalled to the mobility control unit 51, 52:

(a): CSG_reporting_for_CSG_CELLS: "Report when the subscriber enters or leaves or accesses a CSG cell", hereinafter also called first information indicating whether the cell information 63 is to be transmitted or not to the charging unit 53 in case that a subscriber 30, 40 enters and/or leaves and/or accesses the CSG cell 21.

(b): CSG_reporting_for_HYBRID_CELLS_WITH_MEMBERSHIP: "Report when the subscriber enters or leaves or accesses a hybrid cell, in which the subscriber is a CSG member (of the CSG cell part of a hybrid cell)", hereinafter also called third information indicating whether the cell information 63 is to be transmitted or not to the charging unit 53 in case that a subscriber 30, 40 enters and/or leaves the CSG part of the hybrid cell 23, (c): CSG_reporting_for_HYBRID_CELLS_WITHOUT_MEMBERSHIP: "Report when the subscriber enters or leaves or accesses a hybrid cell, in which the subscriber is NOT a CSG member (of the CSG cell part of a hybrid cell)", hereinafter also called fourth information indicating whether the cell information 63 is to be transmitted or not to the charging unit 53 in case that a subscriber 30, 40 enters and/or leaves and/or accesses the non-CSG part (or open part) of the hybrid cell 23.

FIG. 2 includes a dashed line between the mobility control unit 51, 52 and the database 55. This is to indicate that information stored in the database 55 is made available either directly or via further network units (not shown) to the mobility control unit 51, 52.

If no distinction is made between the cases of a membership to a hybrid cell 23 or of a non-membership to the hybrid cell 23, then a second information can be provided indicating whether the cell information 63 is to be transmitted or not to the charging unit 53 in case that a subscriber 30, 31, 32, 33, 40, 41, 42, 43 enters and/or leaves and/or accesses the hybrid cell 23.

Based on the first, second, third and/or fourth information, which is held per subscriber and its active data sessions, the mobility control unit 51, 52 which handles or is informed about the subscriber's registration and mobility events and which handles data and signaling transmission requests, evaluates whether any of the following events occur:

If the subscriber enters or leaves or accesses a CSG cell 21, and the subscriber's state variable (a) (first information) is set to "Yes", then the mobility control unit 51, 52 reports the CSG ID and the Access Mode of CSG cell 21 to the charging unit 53. (The Access mode information refers to whether CSG cell 21 is a CSG cell or a hybrid cell, i.e., in this case a CSG cell).

If the subscriber enters or leaves or accesses a hybrid cell 23, in which the subscriber is a CSG member (of the CSG cell part of a hybrid cell 23), and the subscriber's state variable (b) is set to "Yes", then the mobility control unit 51, 52 reports the CSG ID and the Access Mode of CSG cell 23 as well as the subscriber's CSG membership status to the charging unit 53. (The Access mode information refers to whether hybrid cell 23 is a CSG cell or a hybrid cell, i.e., in this case a hybrid cell. CSG membership status refers to whether the subscriber is a member in this hybrid cell; i.e., in this case, "yes").

If the subscriber enters or leaves or accesses a hybrid cell 23, in which the subscriber is not a CSG member (of the CSG cell part of a hybrid cell 23), and the subscriber's state variable (c) is set to "Yes", then the mobility control unit 51, 52 reports the CSG ID and the Access Mode of CSG cell 23 as well as the subscriber's CSG membership status to the charging unit 53. (The Access mode information refers to whether hybrid cell 23 is a CSG cell or a hybrid cell, i.e., in this case a hybrid cell. CSG membership status refers to whether the subscriber is a member in this hybrid cell; i.e., in this case, "no").

Based on the cell information 63 transmitted to the charging unit 53, the charging unit 53 can perform the differentiated charging.

A benefit of the present invention is that an operator can configure the reporting of CSG-related information (i.e., CSG ID, access mode and for hybrid cells 23 additionally the CSG membership status) independently for CSG cells 21 and hybrid cells 23 (and in the latter case also depending on membership status of a subscriber).

As a result, the CSG/hybrid cell reporting overhead can be reduced significantly in case that an operator intends to perform differentiated charging only for a subset of the different CSG cell types (e.g., differentiated charging for CSG cells versus non-CSG cells but no differentiated charging when accessing the network as a non-CSG members in a hybrid cell versus accessing the network in a non-CSG-cell).

In a further embodiment, in a case where a subscriber can use a first service and a second service (i.e., different kinds of services, e.g., identified by different Access Point Names (APNs) in case of a UTRAN/E-UTRAN network) and the transmission of the cell information (i.e. the reporting according to the present invention) to the charging unit should occur for some of the services only, then the first, second, third and/or fourth information can be stored and applied (by the mobility control unit) for each of these services separately and/or differently. This has the result that, e.g., if the first, second, third and/or fourth information for the first service indicate that the cell information is to be transmitted and the first, second, third and/or fourth information for the second service indicate that the cell information is not to be transmitted, then the cell information is only transmitted if the first service is used.

The invention claimed is:

1. A mobile radio access network, comprising:
   a plurality of radio cells, the plurality of radio cells comprising at least a first cell type of radio cells and a second cell type of radio cells, the first cell type of radio cells being at least one of a Closed Subscriber Group (CSG) cell and a hybrid cell, and the second cell type of radio cells being open cells; and
   a charging unit, configured to receive cell information corresponding to at least one subscriber out of a plurality of subscribers, wherein the cell information is dependent on whether the subscriber has entered, left, or accessed a radio cell of the first cell type;
   wherein a transmission of the cell information to the charging unit occurs or not at the at least one subscriber entering, leaving, or accessing the radio cell of the first type;
   wherein the transmission of the cell information depends on the at least one subscriber entering, leaving, or accessing the CSG cell, a CSG part of the hybrid cell, or an open part of the hybrid cell;
   wherein a first information indicates whether the cell information is to be transmitted or not to the charging unit in the case that the at least one subscriber enters, leaves, or accesses the CSG cell;
   wherein a second information indicates whether the cell information is to be transmitted or not to the charging unit in the case that the at least one subscriber enters, leaves, or accesses the CSG part of the hybrid cell; and
   wherein a third information indicates whether the cell information is to be transmitted or not to the charging unit in the case that the at least one subscriber enters, leaves, or accesses the open part of the hybrid cell.

2. The mobile radio access network according to claim 1, wherein the mobile radio access network comprises:
   a database, the database comprising the first information, the second information, and the third information.

3. The mobile radio access network according to claim 1, wherein the charging unit is configured to receive the cell information further dependent on at least one of:
   cell identification information of the radio cells of the first cell type being at least one CSG cell or at least one hybrid cell;
   the at least one subscriber; and
   an Access Point Name (APN) used by the at least one subscriber.

4. The mobile radio access network according to claim 1, further comprising:
   a mobility control unit for differentiated charging in the mobile radio access network, configured to generate and transmit the cell information towards the charging unit;
   wherein the mobility control unit is one of a MSC unit (Mobile Switching Center unit), SGSN unit (Serving GPRS Support Node) and a MME unit (Mobility Management Entity unit).

5. A mobile radio access network, comprising:
   a plurality of radio cells, the plurality of radio cells comprising at least a first cell type of radio cells and a second cell type of radio cells, the first cell type of radio cells being at least one of a Closed Subscriber Group (CSG) cell and a hybrid cell, and the second cell type of radio cells being open cells;
   a charging unit, configured to receive cell information corresponding to at least one subscriber out of a plurality of subscribers, wherein the cell information is dependent on whether the subscriber has entered, left, or accessed a radio cell of the first cell type;
   wherein the plurality of radio cells comprise the hybrid cell;
   wherein a transmission of the cell information to the charging unit occurs or not at the at least one subscriber entering, leaving, or accessing the hybrid cell;
   wherein the transmission of the cell information depends on the at least one subscriber entering, leaving, or accessing a CSG part of the hybrid cell or an open part of the cell;
   wherein a first information indicates whether the cell information is to be transmitted or not to the charging unit in the case that the at least one subscriber enters, leaves, or accesses the CSG part of the hybrid cell; and
   wherein a second information indicates whether the cell information is to be transmitted or not to the charging unit in the case that the at least one subscriber enters, leaves, or accesses the open part of the hybrid cell.

6. The mobile radio access network according to claim 5, wherein the mobile radio access network comprises:
   a database, the database comprising the first information and the second information.

7. The mobile radio access network according to claim 5, wherein the charging unit is configured to receive the cell information further dependent on at least one of:
   cell identification information of the radio cells of the first cell type being at least one CSG cell or at least one hybrid cell;
   the at least one subscriber; and
   an Access Point Name (APN) used by the at least one subscriber.

8. The mobile radio access network according to claim 5, wherein the mobile radio access network further comprises:
   a database, the database comprising: cell identification information of the radio cells of the first cell type being at least one CSG-cell or at least one hybrid cell, and an Access Point Name (APN).

9. The mobile radio access network according to claim 5, further comprising:
   a mobility control unit for differentiated charging in the mobile radio access network, configured to generate and transmit the cell information towards the charging unit;
   wherein the mobility control unit is one of a MSC unit (Mobile Switching Center unit), SGSN unit (Serving GPRS Support Node) and a MME unit (Mobility Management Entity unit).

10. A method for differentiated charging in a mobile radio access network, the method comprising the steps of:
    transmitting cell information to a charging unit, wherein the transmission of the cell information depends on at least one subscriber entering, leaving, or accessing a radio cell of a first cell type;

wherein the mobile radio access network comprises:
a plurality of radio cells, the plurality of radio cells comprising at least the first cell type of radio cells and a second cell type of radio cells, the first cell type of radio cells being at least one of a Closed Subscriber Group (CSG) cell and a hybrid cell, and the second cell type of radio cells being open cells; and
the charging unit;
wherein the transmission of the cell information to the charging unit occurs or not at the at least one subscriber entering, leaving, or accessing the radio cell of the first type;
wherein the transmission of the cell information depends on the at least one subscriber entering, leaving, or accessing the CSG cell, a CSG part of the hybrid cell, or an open part of the hybrid cell;
wherein a first information indicates whether the cell information is to be transmitted or not to the charging unit in the case that the at least one subscriber enters, leaves, or accesses the CSG cell;
wherein a second information indicates whether the cell information is to be transmitted or not to the charging unit in the case that the at least one subscriber enters, leaves, or accesses the CSG part of the hybrid cell; and
wherein a third information indicates whether the cell information is to be transmitted or not to the charging unit in the case that the at least one subscriber enters, leaves, or accesses the open part of the hybrid cell.

11. A method for differentiated charging in a mobile radio access network, the method comprising the steps of:
transmitting cell information to a charging unit, wherein the transmission of the cell information depends on at least one subscriber entering, leaving, or accessing a radio cell of a first cell type;
wherein the mobile radio access network comprises:
a plurality of radio cells, the plurality of radio cells comprising at least the first cell type of radio cells and a second cell type of radio cells, the first cell type of radio cells being at least one of a Closed Subscriber Group (CSG) cell and a hybrid cell, and the second cell type of radio cells being open cells; and
the charging unit;
wherein the plurality of radio cells comprise the hybrid cell;
wherein the transmission of the cell information to the charging unit occurs not at the at least one subscriber entering, leaving, or accessing the hybrid cell;
wherein the transmission of the cell information depends on the at least one subscriber entering, leaving, or accessing a CSG part of the hybrid cell or an open part of the hybrid cell;
wherein a first information indicates whether the cell information is to be transmitted or not to the charging unit in the case that the at least one subscriber enters, leaves, or accesses the CSG part of the hybrid cell; and
wherein a second information indicates whether the cell information is to be transmitted or not to the charging unit in the case that the at least one subscriber enters, leaves, or accesses the open part of the hybrid cell.

12. A tangible, non-transitory computer-readable medium having computer-executable instructions stored thereon for differentiated charging in a mobile radio access network, the computer-executable instructions comprising:
instructions for transmitting cell information to a charging unit of the mobile radio access network, wherein the transmission of the cell information depends on at least one subscriber entering, leaving, or accessing a radio cell of a first cell type;
wherein the mobile radio access network comprises:
a plurality of radio cells, the plurality of radio cells comprising at least the first tell type of radio cells and a second cell type of radio cells, the first cell type of radio cells being at least one of a Closed Subscriber Group (CSG) cell and a hybrid cell, and the second cell type of radio cells being open cells; and
the charging unit;
wherein the transmission of the cell information to the charging unit occurs or not at the at least one subscriber entering, leaving, or accessing the radio cell of the first type;
wherein the transmission of the cell information depends on the at least one subscriber entering, leaving, or accessing the CSG cell, a CSG part of the hybrid cell, or an open part of the hybrid cell;
wherein a first information indicates whether the cell information is to be transmitted or not to the charging unit in the case that the at least one subscriber enters, leaves, or accesses the CSG cell;
wherein a second information indicates whether the cell information is to be transmitted or not to the charging unit in the case that the at least one subscriber enters, leaves, or accesses the CSG part of the hybrid cell; and
wherein a third information indicates whether the cell information is to be transmitted or not to the charging unit in the case that the at least one subscriber enters, leaves, or accesses the open part of the hybrid cell.

* * * * *